July 5, 1949.  G. W. COAKLEY  2,475,278
UTILITY CART
Filed Aug. 21, 1946  2 Sheets-Sheet 1
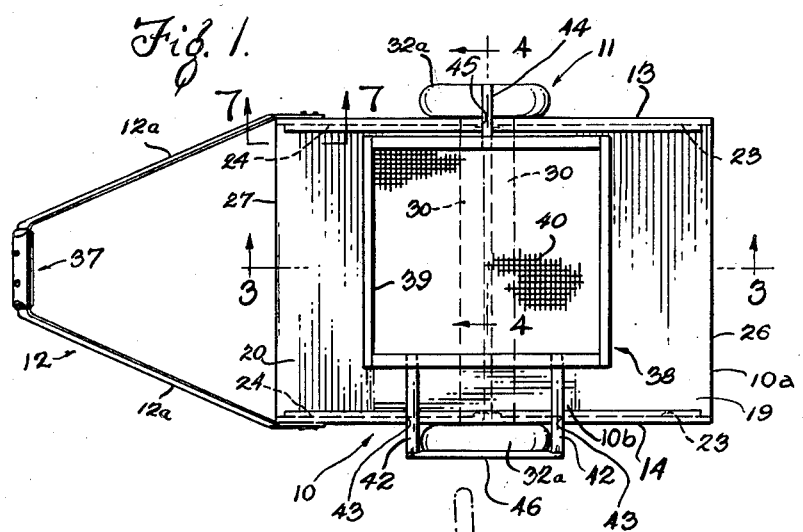
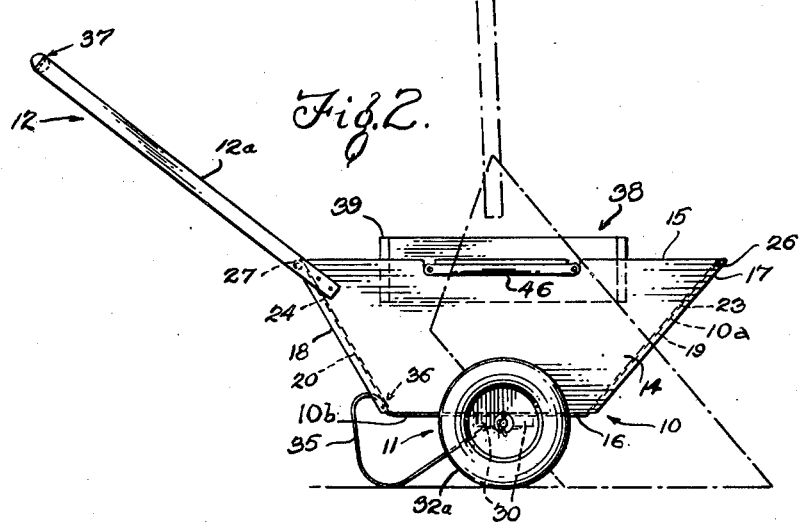
INVENTOR.
George W. Coakley
BY William Cleland
Attorney

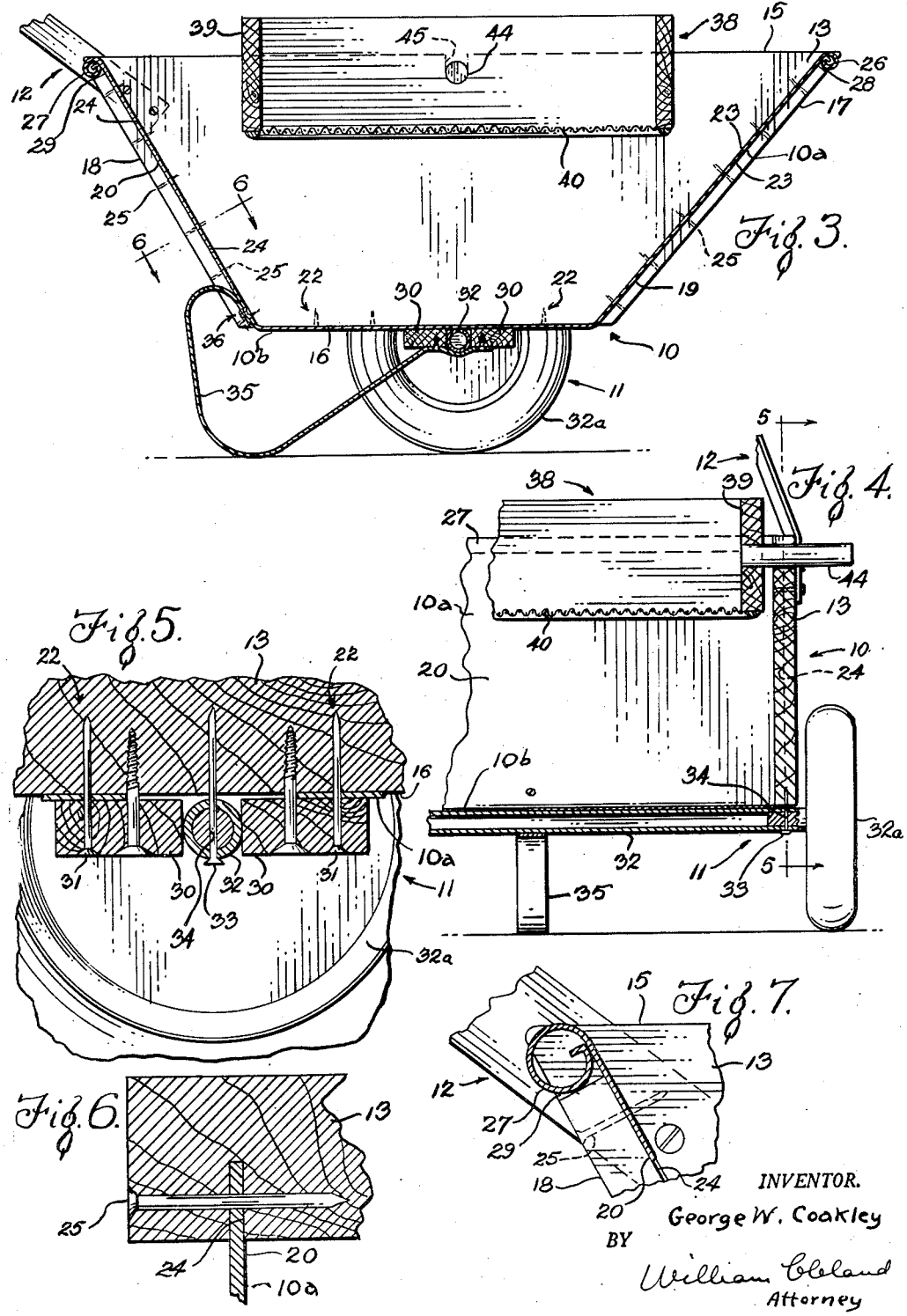

Patented July 5, 1949

2,475,278

UNITED STATES PATENT OFFICE 2,475,278

UTILITY CART

George W. Coakley, Akron, Ohio

Application August 21, 1946, Serial No. 691,897

2 Claims. (Cl. 280—51)

This invention relates particularly to a general utility cart or vehicle.

Heretofore utility carts of the character described provided with all-metal bodies necessarily have had such bodies formed of relatively heavy material to obtain desired strength and durability, and for that reason have been expensive to manufacture particularly from a standpoint of forming-die and other production costs, and at the same time the carts have been cumbersome to handle in use. All wood bodies, on the other hand, have also been objectionable because of cumbersome weight thereof and an inherent tendency to collapse, particularly after extensive use thereof.

One object of this invention is to provide a utility vehicle or cart having a composite body of different materials, the resultant product being strong and durable, and yet being of relatively light weight, the improved construction also being economical to manufacture for the reason that the use of forming-dies may be reduced to a minimum or eliminated entirely.

Another object of the invention is to provide a vehicle of the character described having improved means incorporated therein for screening dirt, ashes or other materials into the same.

These and other objects of the invention will be manifest from the following brief description and the accompanying drawings.

Of the accompanying drawings:

Figure 1 is a top plan view of a utility cart or vehicle embodying the features of the invention.

Figure 2 is a front elevation of Figure 1.

Figure 3 is a vertical cross-section on an enlarged scale, partly broken away, taken substantially on the line 3—3 of Figure 1.

Figure 4 is a fragmentary cross-section on the same scale, taken substantially on the line 4—4 of Figure 1.

Figure 5 is a greatly enlarged fragmentary cross-section taken substantially on the line 5—5 of Figure 4.

Figure 6 is a greatly enlarged cross-section, taken substantially on the line 6—6 of Figure 3.

Figure 7 is an enlarged fragmentary cross-section taken on the line 7—7 of Figure 1.

Referring particularly to Figures 1 to 4, there is illustrated a utility cart essentially including a body 10, a wheel assembly 11 mounted on the underside thereof, and a handle 12 for manual operation of the cart. The body 10 is formed with spaced oppositely disposed side panels 13 and 14, of wood or other material suitable for the present purposes, and an intermediate concave member 10a of sheet material, such as steel, tin, aluminum, etc.

The side panels 13 and 14 may be shaped to have parallel straight top and bottom edges 15 and 16, and straight upwardly diverging front and back edges 17 and 18. The intermediate member 10a may be correspondingly shaped with a flat central bottom panel 10b and upwardly diverging front and back panels 19 and 20. The central member 10a is of substantially uniform width, the marginal edges of the bottom panel 10b thereof overlying the bottom edges 16 of the side panels, and being secured thereto as by means of nails received through marginal side portions and into the plane of the side panels, as indicated at 22, 22 in Figure 3. The opposite marginal edges of the front and back panels 19 and 20 are snugly received in elongated slots of substantial depth in the inner faces of the side panels, closely adjacent and parallel to the front and rear edges 17 and 18 thereof, as indicated at 23, 23, and 24, 24. The depth of these slots is such as to receive a substantial margin of the edges of the front and rear panels, sufficient to receive nails 25, 25 extending in the plane of the side panels from the edges thereof (see Figures 3, 6 and 7). For reinforcement and safety purposes, the top edges of the front and back panels may be beaded or rounded as indicated at 26 and 27, the upper corners of the side panels being recessed as indicated at 28 and 29 to receive the ends of said beaded portions (see Figures 3 and 7). This composite wood and metal body construction is simple and economical to manufacture, and is extremely rigid and will stand substantial abuse in use.

The body 10 may be reinforced at the bottom as by means of spaced wooden slats 30, 30, secured by nails 31, 31 extending through the ends thereof, through the marginal edges of the panel 10b, and into the plane of the side panels 13 and 14 (see Figures 3 and 5). Snugly received between the adjacent slats 30 may be an axle 32 which is similarly secured by means of nails 33, 33, received through spaced apertures 34 in the axle, the nails 33 being received through apertures in the marginal edges of the bottom panel 10b and extended into the planes of the side panels. Suitable wheels 32a, 32a are provided on ends of the axle extending freely at opposite sides of the body 10.

A strip of metal is formed substantially V-shaped to provide a foot or stop 35, rearwardly of the wheels, one end of the strip being inturned at 36 and secured to the rear panel 20, and the other end being formed forwardly straight and secured across the reinforcing strips 30, 30, as best shown in Figure 3. The foot 35 prevents rearward tilting of the cart on the wheels, the cart being balanced on the wheel assembly to prevent forward tilting in normal use. The angle of the forward face of the body 10 is such as to engage flatly upon a supporting surface when the body is tilted forwardly, as indicated in chain-dotted lines in Figure 2.

The handle member 12 is formed of strip metal to provide upwardly and rearwardly inclined, opposite side members 12a, 12a, secured at the lower ends thereof to the side panels 13 and 14, and a central cross-piece, indicated at 37, this cross-piece having suitable hand grip means provided thereon.

A screening or sifting device 38 is removably and laterally shiftably mounted at the top of the body 10. To this end, the device 38 comprises a rectangular frame 39 having a screen or mesh bottom 40, the frame being normally non-tiltably supported on the body 10 by means of spaced rods 42, 42 extending outwardly from one side thereof and received in spaced slots or notches 43, 43 in the upper edge of the side panel 14, and by a single rod 44 extending from the other side of the frame to be received in a similar slot or notch 45 in the top edge of the other side panel 13. A cross member 46, connected between the ends of the rods 42, 42, extended outwardly of the body 10, provides a hand grip by which the frame 38 may be laterally reciprocated relatively of the body 10, for sifting or mixing materials such as soil, fertilizer, etc. or for sifting coal ashes or the like, into the cart for any desired purpose. If desired on occasion, the frame 39 may be tilted to free the rods 42, 42 from the groove 43 thereof, to permit inverting of the frame while pivoted on the single rod 44, as for dumping material from the screening device into the cart.

The cart described above is adapted to be used for many purposes around the home or elsewhere, with or without the screening or sifting device 38 attached. The use and operation thereof is otherwise as previously described.

Modifications of the invention may be resorted to without departing from the spirit thereof or the scope of the appended claims.

What is claimed is:

1. A vehicle of the character described, comprising a body having opposite side, front, back and bottom panels, said opposite side panels being of wood or like material and having elongated slots on the inner faces thereof coextensive with and adjacent to the front and rear edges of the same, said front, rear and bottom panels being formed from one piece of sheet material, the opposite marginal edge portions of the front and rear panels being received in the corresponding slots in said opposite side panels and the opposite marginal edge portions of the bottom panel overlying the bottom edges of the opposite side panels, means for securing said sheet material to the side panels, and wheel mounting means secured to the bottom of said body.

2. A vehicle of the character described, comprising a body having opposite side, front, back and bottom panels, said opposite side panels being of wood or like material and having elongated slots on the inner faces thereof coextensive with and adjacent to the front and rear edges of the same, said front, rear and bottom panels being formed from one piece of sheet material, the opposite marginal edge portions of the front and rear panels being received in the corresponding slots in said opposite side panels and the opposite marginal edge portions of the bottom panel overlying the bottom edges of the opposite side panels, means for securing said sheet material to the side panels, wheel mounting means secured to the bottom of said body, said securing means comprising nails extending into the edges of said side panels through said marginal edges of said sheet material.

GEORGE W. COAKLEY.

REFERENCES CITED

The following references are of record in the file of this patent:

UNITED STATES PATENTS

| Number | Name | Date |
|---|---|---|
|  | Purdy | Oct. 4, 1817 |
| 961,609 | Harris | June 14, 1910 |
| 1,293,330 | Carroll | Feb. 4, 1919 |
| 2,102,684 | Dorward | Dec. 21, 1937 |
| 2,249,019 | Masters | July 15, 1941 |
| 2,274,048 | Derman | Feb. 24, 1942 |
| 2,374,278 | Fuerstenberg | Apr. 24, 1945 |